(12) United States Patent
Shiramizu et al.

(10) Patent No.: US 10,890,888 B2
(45) Date of Patent: Jan. 12, 2021

(54) CONTROL APPARATUS, CONTROL PROGRAM, CONTROL SYSTEM, AND CONTROL METHOD

(71) Applicant: OMRON Corporation, Kyoto (JP)

(72) Inventors: Gaku Shiramizu, Ayabe (JP); Yuki Hirohashi, Nara (JP)

(73) Assignee: OMRON Corporation, Kyoto (JP)

( * ) Notice: Subject to any disclaimer, the term of this patent is extended or adjusted under 35 U.S.C. 154(b) by 365 days.

(21) Appl. No.: 15/924,393

(22) Filed: Mar. 19, 2018

(65) Prior Publication Data

US 2018/0292799 A1 Oct. 11, 2018

(30) Foreign Application Priority Data

Apr. 5, 2017 (JP) ................................. 2017-075056

(51) Int. Cl.
  *G05B 19/05* (2006.01)
  *G05B 23/02* (2006.01)
(52) U.S. Cl.
  CPC ......... *G05B 19/05* (2013.01); *G05B 23/0235* (2013.01); *G05B 2219/1101* (2013.01); *G05B 2219/1134* (2013.01); *G05B 2219/13175* (2013.01); *G05B 2219/15055* (2013.01)
(58) Field of Classification Search
  CPC ........ G05B 23/0235; G05B 2219/1134; G05B 2219/13175; G05B 2219/15055; G05B 2219/1101; G05B 19/05
  See application file for complete search history.

(56) References Cited

U.S. PATENT DOCUMENTS

| | | |
|---|---|---|
| 2005/0246593 A1 | 11/2005 | Littrell |
| 2006/0271271 A1 | 11/2006 | Chauvin et al. |
| 2012/0072002 A1 | 3/2012 | Ino |
| 2013/0293217 A1 | 11/2013 | Moiseev et al. |
| 2015/0127272 A1 | 5/2015 | Sundquist |
| 2016/0056794 A1 | 2/2016 | Geissdorfer et al. |
| 2017/0185055 A1* | 6/2017 | Nakajima ........... H04L 43/0852 |

FOREIGN PATENT DOCUMENTS

| | | |
|---|---|---|
| CN | 103140814 A | 6/2013 |
| CN | 104246218 A | 12/2014 |
| CN | 105372988 A | 3/2016 |

(Continued)

OTHER PUBLICATIONS

The Japanese Office Action dated Feb. 26, 2019 in a counterpart Japanese patent application.

(Continued)

*Primary Examiner* — Mischita L Henson
(74) *Attorney, Agent, or Firm* — Metrolex IP Law Group, PLLC

(57) ABSTRACT

A control apparatus for controlling a control target includes: an acquisition unit, a determination unit, and a delay time adding unit. The acquisition unit acquires at least first and second measurement values related to a control target, such as a machine. The determination unit determines whether the control target is in a predetermined state, such as a normal state or an abnormal state, based on the measurement values acquired by the acquisition unit. The delay time adding unit adds delay to at least one of the first and second measurement values.

10 Claims, 16 Drawing Sheets

(56) References Cited

FOREIGN PATENT DOCUMENTS

| | | |
|---|---|---|
| JP | H8-221113 A | 8/1996 |
| JP | 2000-010627 A | 1/2000 |
| JP | 2003-58248 A | 2/2003 |
| JP | 2005-257422 A | 9/2005 |
| JP | 2006-336644 A | 12/2006 |
| JP | 2009-238190 A | 10/2009 |
| JP | 2012-064085 A | 3/2012 |
| JP | 2012-112330 A | 6/2012 |

OTHER PUBLICATIONS

The extended European search report (EESR) dated Aug. 23, 2018 in a counterpart European patent application.
The office action dated Dec. 10, 2019, in a counterpart Japanese patent application.
The Japanese Office Action dated Jul. 16, 2019 in a counterpart Japanese patent application.
Office Action dated Aug. 11, 2020 in a counterpart Chinese patent application.

* cited by examiner

| | MACHINE DESIGN DATA | RECIPE PARAMETERS | |
| --- | --- | --- | --- |
| | INTER-MECHANISM DISTANCE (mm) | PACKAGE LENGTH (mm) | PRODUCTION QUANTITY (cpm) |
| RECIPE A | $D_{A-B}$ | $L_A$ | $C_A$ |
| RECIPE B | $D_{A-B}$ | $L_B$ | $C_B$ |
| ... | ... | ... | ... |

CONTROL APPARATUS, CONTROL PROGRAM, CONTROL SYSTEM, AND CONTROL METHOD

CROSS-REFERENCES TO RELATED APPLICATIONS

This application claims priority to Japanese Patent Application No. 2017-075056 filed Apr. 5, 2017, the entire contents of which are incorporated herein by reference.

FIELD

The disclosure relates to a control apparatus that can acquire measurement values related to a control target, a control program executed by the control apparatus, a control system that includes the control apparatus, and a control method executed by the control apparatus.

BACKGROUND

FA (Factory Automation) technology that employs a control apparatus such as a PLC (programmable controller) is commonly used in various fields of production. In some cases, the function of not only controlling a control target, but also monitoring and detecting an abnormality that may occur in a control target is implemented in such a control apparatus. For example, JP 08-221113A discloses a system that diagnoses, monitors, and predicts an abnormality in a plant, using past chronological data that has been accumulated.

Also, JP 2003-058248A discloses technology that is similar in that chronological data is used, yet different in terms of abnormality monitoring and detection. More specifically, JP 2003-058248A discloses a configuration for efficiently searching for and displaying similar past events to assist an operator in operating a plant.

JP 08-221113A and JP 2003-058248A are examples of background art.

SUMMARY

JP 08-221113A above discloses a configuration that uses pieces of chronological data, which are a plurality of process values, and all of these pieces of chronological data are acquired by measuring the same target. However, in reality, there is a demand to monitor and detect an abnormality using measurement values measured at different measurement points of the same process, or measurement values measured in different processes. JP 08-221113A does not disclose any solution to such a demand.

Also, JP 2003-058248A aims to assist an operator in operating a plant, and does not disclose a solution to the above-described demand.

In view of the above-described demand, one or more aspects may provide a mechanism that facilitates determination processing that is performed using a plurality of measurement values.

According to one aspect, a control apparatus for controlling a control target is provided. The control apparatus includes: an acquisition unit configured to acquire a measurement value related to the control target; a determination unit configured to determine whether or not the control target is in a predetermined state based on a plurality of measurement values acquired at predetermined points in time, or based on temporal changes in a plurality of measurement values detected during a predetermined period of time; and a delay time adding unit configured to add a predetermined delay time to at least one measurement value out of the plurality of measurement values that are used by the determination unit to perform determination.

According to this aspect, even if there is a time lag between the same events appearing in the measurement values, the delay time adding unit adds an appropriate delay time, and the determination unit can be provided with a plurality of measurement values that have undergone timing adjustment.

It may be preferable that the delay time is determined based on a difference between mechanisms or processes of the control target with which the plurality of measurement values are associated.

According to this aspect, it is possible to appropriately determine the state of the control target using a plurality of measurement values acquired from a control target that includes a plurality of mechanisms or processes.

It may be preferable that the delay time is determined based on design data that indicates properties of the mechanisms or processes of the control target, and based on parameters that indicate operational states of the mechanisms or processes of the control target.

According to this aspect, it is easy to realize the delay time adding unit because it is possible to theoretically calculate the delay time based on known information, and to constitute a delay time adding unit corresponding to the delay time.

It may be preferable that the delay time is determined based on a period of time from when a disturbance that has a predetermined feature is applied to a first mechanism or a first process of the control target, until when a feature corresponding to the disturbance appears in a second mechanism or a second process of the control target.

According to this aspect, it is possible to determine a delay time based on measurement values that have been actually measured. Therefore, it is possible to determine an appropriate delay time according to the control target in reality, and it is also possible to determine a delay time even if detailed design information or the like is unknown.

It may be preferable that the delay time adding unit includes a buffer memory that has a number of stages, the number corresponding to the delay time.

According to this aspect, the buffer memory is used to accelerate data access, and it is also easier to realize the delay time adding unit compared to when a database or the like is used.

It may be preferable that the number of stages of the buffer memory is determined based on the delay time and a period of cycles in which a measurement value corresponding to the delay time is updated.

According to this aspect, it is possible to optimize the number of stages of the buffer memory according to the period of cycles in which a measurement value is updated. Therefore, it is unnecessary to excessively increase the number of stages, and it is possible to optimize the required storage area at the time of implementation.

It may be preferable that the buffer memory is located on a data transmission path from a field device to the control apparatus, the field device measuring a measurement value from the control target.

According to this aspect, the buffer memory is located on a data transmission path from a field device to the control apparatus, and thus it is possible to add an appropriate delay time corresponding to each field device.

According to another aspect, a control program that is executed by a control apparatus for controlling a control target is provided. The control program causes the control apparatus to execute: acquiring a measurement value related to the control target; determining whether or not the control target is in a predetermined state based on a plurality of measurement values acquired at predetermined points in time, or based on temporal changes in a plurality of measurement values detected during a predetermined period of time; and adding a predetermined delay time to at least one measurement value out of the plurality of measurement values that are used to perform the determination.

According to this aspect, even if there is a time lag between the same events appearing in the measurement values, an appropriate delay time is added in the step of adding a delay time, and the determination processing can be executed using a plurality of measurement values that have undergone timing adjustment.

According to yet another aspect, a control system for controlling a control target is provided. The control system includes: a control apparatus; and a field device configured to measure a measurement value from the control target. The control apparatus includes: an acquisition unit configured to acquire a measurement value related to the control target; a determination unit configured to determine whether or not the control target is in a predetermined state based on a plurality of measurement values acquired at predetermined points in time, or based on temporal changes in a plurality of measurement values detected during a predetermined period of time; and a delay time adding unit configured to add a predetermined delay time to at least one measurement value out of the plurality of measurement values that are used by the determination unit to perform determination.

According to this aspect, even if there is a time lag between the same events appearing in the measurement values, the delay time adding unit adds an appropriate delay time, and a plurality of measurement values that have undergone timing adjustment can be used in the determination step.

According to yet another aspect, a control method that is executed by a control apparatus for controlling a control target is provided. The control method includes: acquiring a measurement value related to the control target; determining whether or not the control target is in a predetermined state based on a plurality of measurement values acquired at predetermined points in time, or based on temporal changes in a plurality of measurement values detected during a predetermined period of time; and adding a predetermined delay time to at least one measurement value out of the plurality of measurement values that are used to perform the determination.

According to this aspect, even if there is a time lag between the same events appearing in the measurement values, the delay time adding unit adds an appropriate delay time, and a plurality of measurement values that have undergone timing adjustment can be used in the determination step.

According to one or more aspects, it may be possible to facilitate determination processing that is performed using a plurality of measurement values.

DETAILED DESCRIPTION

Figure 1:
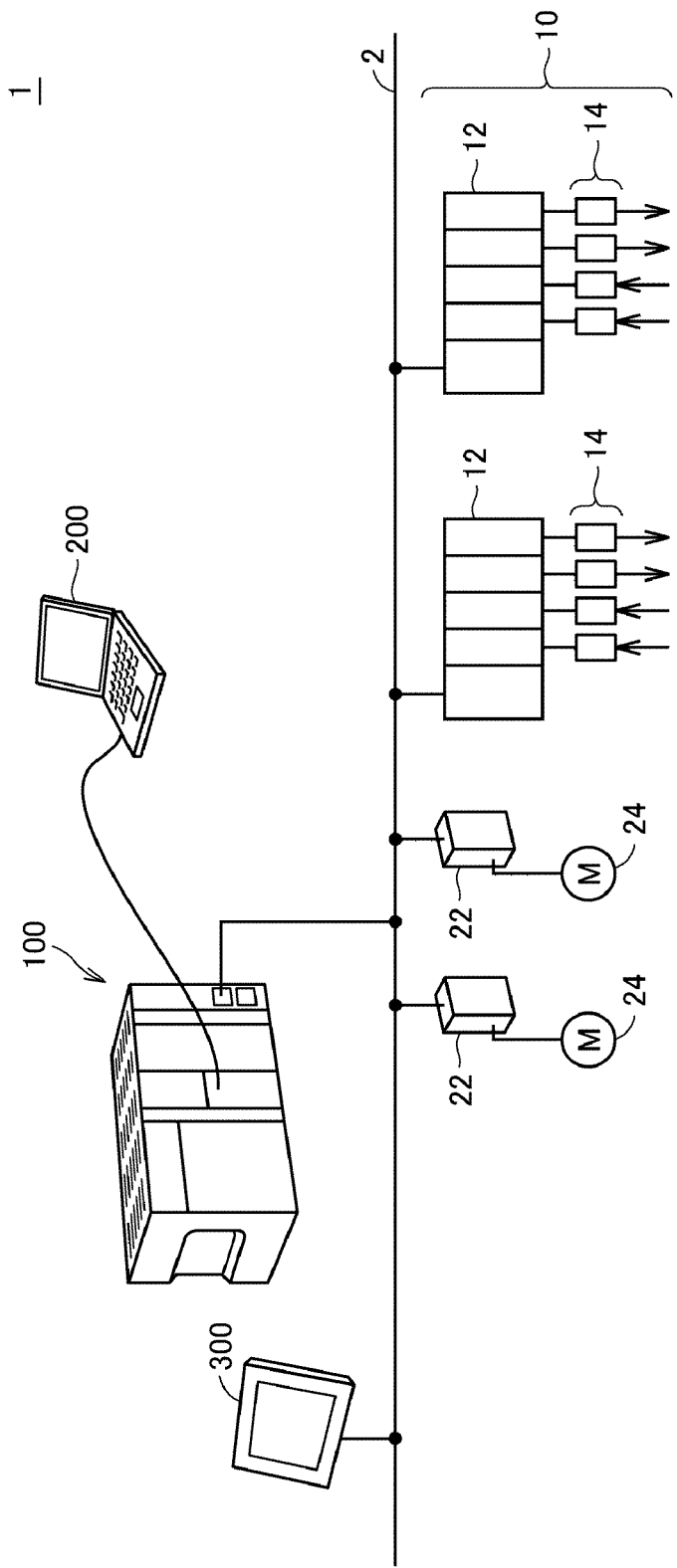
FIG. 1 is a schematic diagram illustrating an example of an overall configuration of a control system according to one or more embodiments.

The following describes one or more embodiments in detail with reference to the drawings. Note that the same or corresponding components in the drawings are assigned the same reference numerals and descriptions thereof are not repeated.

A. Example of Overall Configuration of Control System

First, an example of an overall configuration of a control system 1 that includes a control apparatus according to one or more embodiments will be described.

FIG. 1 is a schematic view showing an example of an overall configuration of the control system 1 according to one or more embodiments. As shown in FIG. 1, the control system 1 according to one or more embodiments includes a control apparatus 100 for controlling a control target, as a main constituent element. The control system 1 in its entirety controls the control target.

The control apparatus 100 may be realized as a kind of computer such as a PLC (programmable controller). The control apparatus 100 is connected to a field device group 10 or one or more display apparatuses 300 via a field bus 2. The control apparatus 100 transmits and receives data to and from apparatuses that are connected to the control apparatus 100, via one or more buses or networks. Generally, "field bus" is also referred to as "field network". However, a generic term "field bus" is used in the following to simplify descriptions. That is, "field buses" in the present specification may include "field networks" in addition to "field buses".

The control apparatus 100 can cyclically execute control computations to control a manufacturing apparatus or facility, and execute data collection processing described below.

Preferably, a bus or a network for periodic communication, which guarantees accurate data arrival time, is employed as the field bus 2. EtherCAT® may be employed as a bus or a network for periodic communication. Alternatively, EtherNet/IP®, DeviceNet®, CompoNet®, or the like may be employed as the field bus 2.

The field device group 10 collectively refers to an apparatus that collects input data from a manufacturing apparatus and a production line related to a control target or control (hereinafter also collectively referred to as "field"), and an apparatus that has a certain effect on the field based an instruction generated in the control apparatus 100 (hereinafter also referred to as "output data").

The field device group 10 transmits and receives data that includes the input data and the output data to and from the control apparatus 100 via the field bus 2. In the example configuration shown in FIG. 1, the field device group 10 includes remote I/O (Input/Output) apparatuses 12, field devices 14, servo drivers 22, and servo motors 24.

Each remote I/O apparatus 12 includes a communication coupler that performs communication via the field bus 2, and an I/O unit for acquiring input data and outputting output data.

Each field device 14 is electrically connected to the I/O unit of a remote I/O apparatus 12, and performs conversion of input signals and output signals related to a control target. For example, the field devices 14 may include an input relay and various kinds of sensors (such as an analogue sensor, a temperature sensor, and a vibration sensor), which are devices for collecting input data. The field devices 14 may also include an output relay, a contactor, a servo driver, a servo motor, and any other actuators, which are devices that have a certain effect on the field.

The field device group 10 is not limited to the devices mentioned above, and any device that can collect the input data or perform a certain action that is based on the output data may be employed.

Note that the I/O units included in the remote I/O apparatuses 12 may be directly connected to the field bus 2.

As shown in FIG. 1, the control apparatus 100 and the field device group 10 transmit and receive data to and from each other via the field bus 2, and data that is transmitted and received is updated at very short intervals in a range from the order of several hundred microseconds to the order of several ten milliseconds. Processing that is performed to update data that is transmitted and received is also referred to as I/O refresh processing. Also, in the following description, the period of cycles in which measurement values are updated is also referred to as "sampling period".

Each of the one or more display apparatuses 300 that are connected to the control apparatus 100 via the field bus 2 accepts an operation performed by a user, and outputs a command that corresponds to the user operation to the control apparatus 100, and also graphically displays the results of computations performed in the control apparatus 100.

A support apparatus 200 may be connectable to the control apparatus 100. The support apparatus 200 is an apparatus that assists the control apparatus 100 in performing preparations that are necessary for the control apparatus 100 to control a control target. Specifically, the support apparatus 200 provides a development environment in which programs that are to be executed by the control apparatus 100 are developed (e.g. a program creating/editing tool, a parser, and a compiler) and a setting environment in which parameters (configuration) of the control apparatus 100 and various kinds of devices that are connected to the control apparatus 100 are set, and can execute processing to output a user program that has been generated, to the control apparatus 100, processing to perform online correction/modification of a user program or the like that is to be executed on the control apparatus 100, and so on.

The support apparatus 200 further accepts various settings for realizing delay processing, which will be described later. Details of processing mentioned above will be described later.

Note that the control apparatus 100 may further be connected to a database server or the like via a host network or the like. If such a configuration is employed, input data collected by the control apparatus 100, for example, may be transmitted to the host database server.

B. Examples of Hardware Configurations

Next, examples of hardware configurations of the control apparatus 100 and the support apparatus 200 included in the control system 1 according to one or more embodiments will be described.

b1: Control Apparatus

Figure 2:
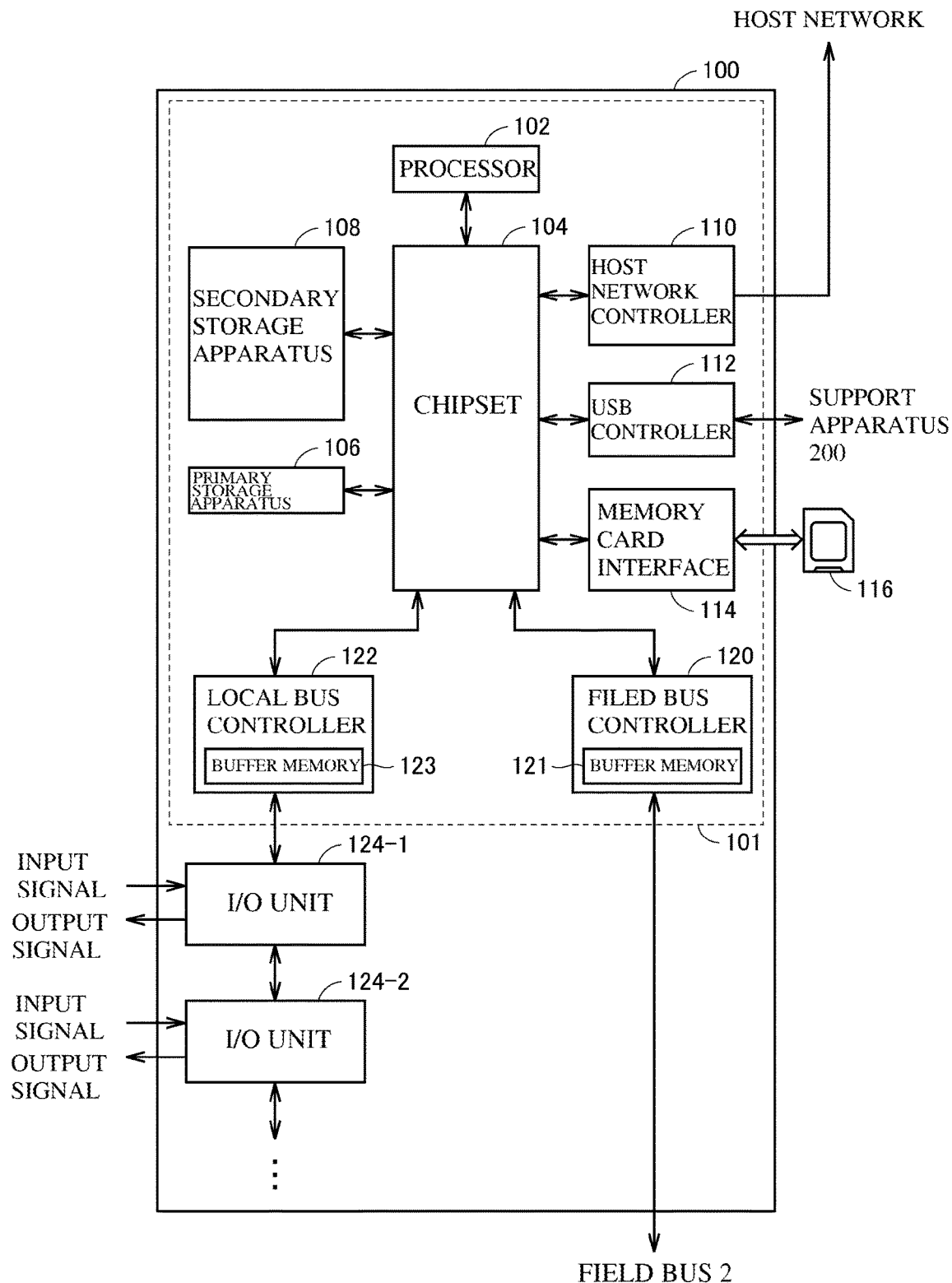
FIG. 2 is a block diagram illustrating an example of a hardware configuration of a control apparatus that is included in a control system according to one or more embodiments.

FIG. 2 is a block diagram showing an example of a hardware configuration of the control apparatus 100 included in the control system 1 according to one or more embodiments. As shown in FIG. 2, the control apparatus 100 includes a CPU unit 101 and one or more I/O units 124-1, 124-2, and so on.

The CPU unit 101 corresponds to the computation processor, and includes a processor 102, a chipset 104, a primary storage apparatus 106, a secondary storage apparatus 108, a host network controller 110, a USB (Universal Serial Bus) controller 112, a memory card interface 114, a local bus controller 122, and a field bus controller 120.

The processor 102 includes, for example, a CPU, an MPU, or a GPU, and performs control that corresponds to a control target and various kinds of processing, which will be described below, by reading out various kinds of programs that are stored in the secondary storage apparatus 108, loading the programs to the primary storage apparatus 106, and executing the programs. The secondary storage apparatus 108 includes, for example, a non-volatile storage apparatus such as an HDD (Hard Disk Drive or an SSD (Solid State Drive). The primary storage apparatus 106 includes, for example, a volatile storage apparatus such as a DRAM (Dynamic Random Access Memory) or an SRAM (Static Random Access Memory).

The chipset 104 controls the processor 102 and the devices to realize the entirety of the processing that is performed by the control apparatus 100.

The secondary storage apparatus 108 stores, in addition to system programs for basic operations, user programs that are created for a control target manufacturing apparatus and facility. Furthermore, a database for storing various kinds of data in chronological order may be created in the secondary storage apparatus 108.

The host network controller 110 transmits and receives data to and from a database server and so on via a host network. Typically, the host network controller 110 is realized using a dedicated circuit such as an ASIC (Application Specific Integrated Circuit) or an FPGA (Field-Programmable Gate Array).

The USB controller 112 controls transmission and reception of data to and from the support apparatus 200 via USB connection. Typically, the USB controller 112 is realized using a dedicated circuit such as an ASIC or an FPGA.

The memory card interface 114 is configured such that a memory card 116 can be attached to and detached from the memory card interface 114, and can write data to the memory card 116 and read out various kinds of data (e.g. user programs and trace data) from the memory card 116.

The local bus controller 122 is an interface that transmits and receives data to and from the I/O units 124-1, 124-2, and so on connected to the CPU unit 101. The local bus controller 122 has a buffer memory 123 for temporarily storing data that is transmitted to and received from the I/O units 124-1, 124-2, and so on. The buffer memory 123 performs FIFO (First In First Out) operations to provide delay processing described below.

The field bus controller 120 controls data transmission and reception to and from another device via the field bus 2. Typically, the field bus controller 120 is realized using a dedicated circuit such as an ASIC or an FPGA, but may be implemented as software. If software implementation is employed, the field bus controller 120 mainly includes a processor, a primary storage apparatus, a storage, and so on, and the processor reads out a system program (firmware) or the like stored in the storage, loads the program to the primary storage apparatus, and executes the program to realize necessary processing. The field bus controller 120 has a buffer memory 121 for temporarily storing data that is transmitted and received via the field bus 2. The buffer memory 121 performs FIFO operations to provide delay processing described below.

Although FIG. 2 shows an example of a configuration in which necessary processing is provided by the processor 102 executing programs, at least part or all of the processing that can be thus provided may be implemented using a dedicated hardware circuit (e.g. an ASIC or an FPGA). Alternatively, the main part of the control apparatus 100 may be realized using hardware that conforms to a general-purpose architecture (e.g. an industrial-purpose personal computer that is based on a general-purpose personal computer). If this is the case, it is possible to execute a plurality of OSs (Operating Systems) for different purposes in parallel and execute necessary application software on each OS, using virtualization technology.

b2: Support Apparatus

Figure 3:
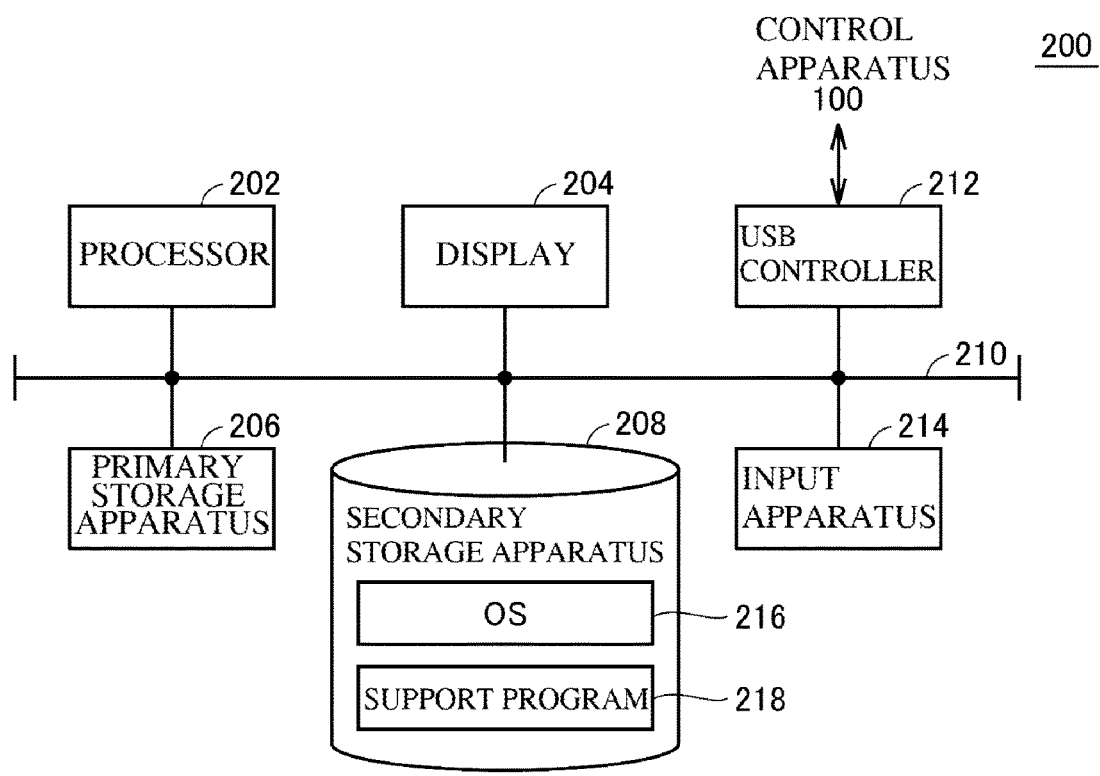
FIG. 3 is a block diagram illustrating an example of a hardware configuration of a support apparatus that is included in a control system according to one or more embodiments.

FIG. 3 is a block diagram showing an example of a hardware configuration of the support apparatus 200 included in the control system 1 according to one or more embodiments. Typically, the support apparatus 200 is realized as a result of a support program being executed on a personal computer that has general-purpose architecture.

More specifically, as shown in FIG. 3, the support apparatus 200 includes a processor 202, a display 204, a primary storage apparatus 206, a secondary storage apparatus 208, a USB controller 212, and an input apparatus 214. These components are connected via an internal bus 210.

The processor 202 includes, for example, a CPU, an MPU, or a GPU, and performs various kinds of processing described above, by reading out various kinds of programs including an OS 216 and a support program 218 that are stored in the secondary storage apparatus 208, loading the programs to the primary storage apparatus 206, and executing the programs. The secondary storage apparatus 208 includes, for example, a non-volatile storage apparatus such as an HDD or an SSD. The primary storage apparatus 206 includes, for example, a volatile storage apparatus such as a DRAM or an SRAM.

The display 204 is a device that displays the results of computations performed by the processor 202 and so on, and includes an LCD (Liquid Crystal Display) or the like, for example.

The USB controller 212 transmits and receives data to and from the CPU unit 101 via USB connection. Typically, the USB controller 212 is realized using a dedicated circuit such as an ASIC or an FPGA.

The input apparatus 214 is a device for accepting a user operation, and includes, for example, a keyboard, a memory, and so on.

b3: Others

In the control system 1 shown in FIG. 1 described above, the control apparatus 100, the support apparatus 200, and the display apparatuses 300 are configured as separate apparatuses. However, it is possible to employ a configuration in which all or part of processing performed thereby is aggregated in a single apparatus.

C. Overview of Data Collection Processing

Next, the following describes an overview of data collection processing that is provided by the control apparatus 100 according to one or more embodiments.

Figure 4:
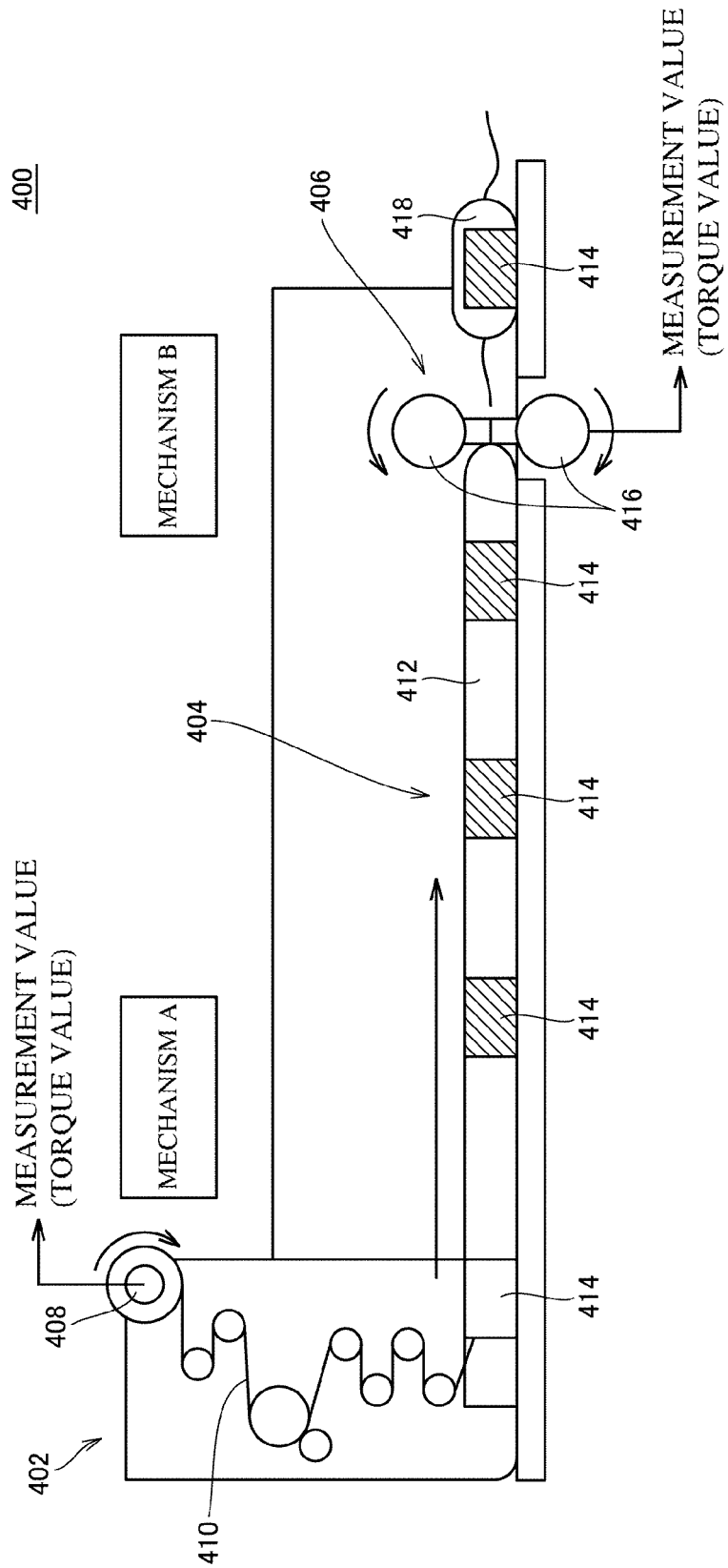
FIG. 4 is a schematic diagram illustrating an example of a control target from which data is collected by a control apparatus according to one or more embodiments.

FIG. 4 is a schematic diagram showing an example of a control target from which data is collected by a control apparatus 100 according to one or more embodiments. As shown in FIG. 4, a packaging machine 400 is envisioned as an example of a control target.

The packaging machine 400 is constituted by a plurality of mechanisms that operate in conjunction with each other, and specifically includes a supplying mechanism 402 (hereinafter also referred to as "mechanism A") that supplies a packaging base material 410, a cutting mechanism 406 (hereinafter also referred to as "mechanism B") that cuts a packaging material 412 to generate individual packages 418, and a transport mechanism 404 that transports workpieces 414 that are enclosed by the packaging material 412, from the supplying mechanism 402 to the cutting mechanism 406.

The supplying mechanism 402 sequentially sends out the packaging base material 410 that is in a roll shape, using a supply roller 408, and covers the workpieces 414 that are supplied from a production line (not sown), with the packaging base material 410, to sequentially supply the packaging material 412 in which workpieces 414 are enclosed, to the transport mechanism 404.

The transport mechanism 404 sequentially transports the packaging material 412 in which the workpieces 414 are enclosed, to the cutting mechanism 406. The cutting mechanism 406 drives a pair of cutting rollers 416 according to a predetermined timing to cut and seal the packaging material 412, to sequentially generate individual packages 418.

The control apparatus 100 can collect any measurement values from a control target. In one or more embodiments, "measurement values" are mainly values (input values) that indicate the results of measurement performed by any of the field devices, but the measurement values are not limited to such values. That is, "measurement values" in the present specification are a concept that includes all of the values that are available to the processor 102 of the control apparatus 100. Therefore, "measurement values" in the present specification may include output values calculated by the processor 102 of the control apparatus 100 performing control computations, and intermediate values calculated in the process of execution of the control computations.

For example, the control apparatus 100 can collect a torque value that is generated in the supply roller 408 of the supplying mechanism 402 (the mechanism A), and a torque value that is generated in the cutting rollers 416 of the cutting mechanism 406 (the mechanism B). The control apparatus 100 can monitor and detect an abnormality in the packaging machine 400 based on temporal changes in the measurement values collected from such mechanisms.

In the packaging machine 400, torque increases by a relatively large amount at cutting by the cutting rollers 416, and torque generated in the supply roller 408 may also change as a result of being affected when the packaging material 412 is cut. That is, the value of torque generated in the supply roller 408 and the torque value generated in the cutting rollers 416 have a significant correlation. Therefore, as an example of a method for monitoring and detecting an abnormality, it is possible to detect whether or not the state is a normal state or an abnormal state based on the correlation between the torque value generated in the supply roller 408 and the torque value generated in the cutting rollers 416. As an example of such a correlation, it is possible to define a normal state area and an abnormal state area on a coordinate space that is defined by two torque values, and to determine whether the state is a normal state or an abnormal state based on, to which area the torque value measured when monitoring was performed belongs.

Figure 5A:
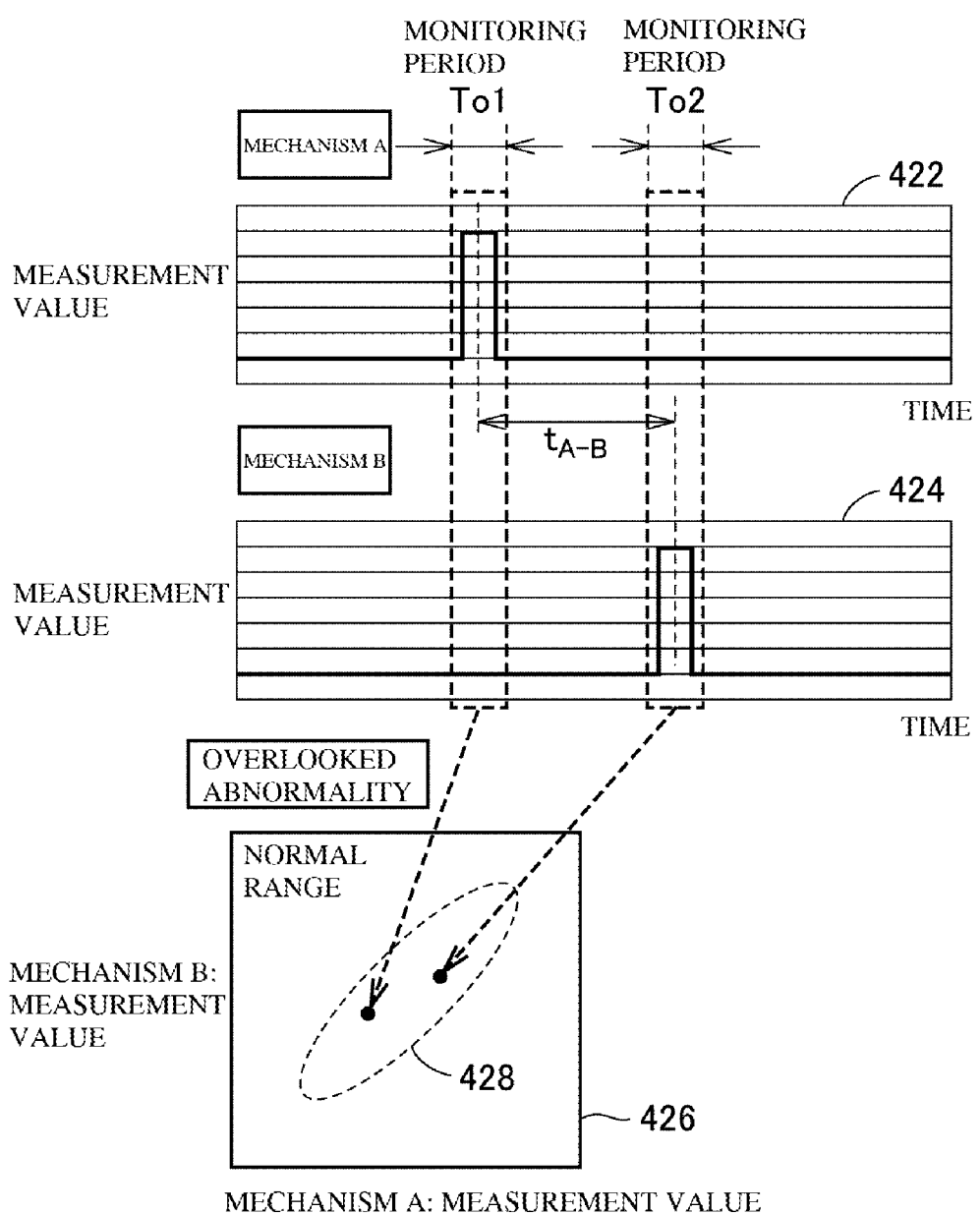
FIGS. 5A and 5B are diagrams illustrating real-time detection based on temporal changes in measurement values collected from a plurality of mechanisms such as those shown in FIG. 4.
Figure 5B:
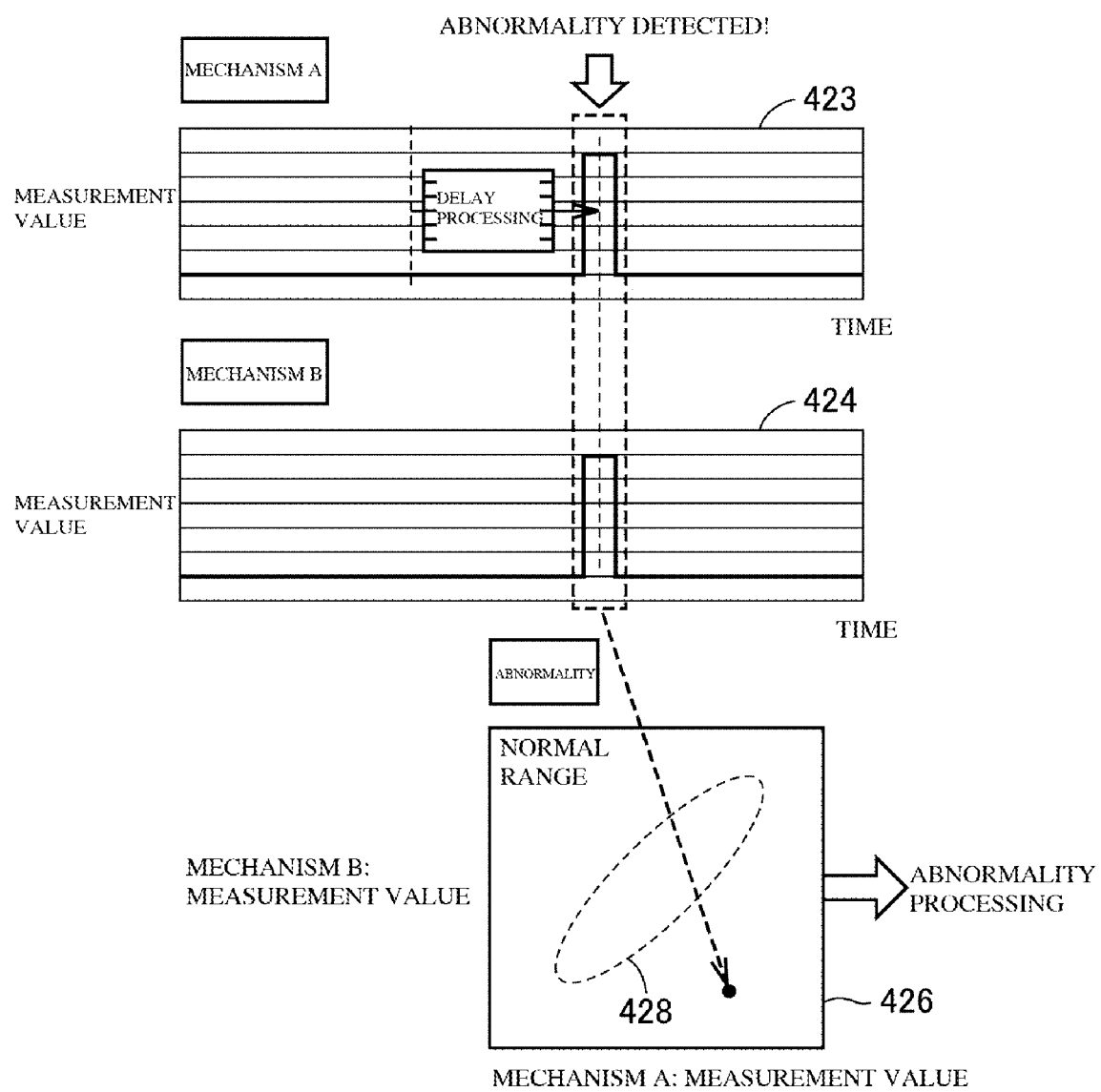

FIGS. 5A and 5B are diagrams illustrating real-time detection based on temporal changes in measurement values collected from a plurality of mechanisms shown in FIG. 4. FIG. 5A shows an example of a typical method, and FIG. 5B shows an example of a method to which data collection processing according to one or more embodiments is applied.

As shown in FIGS. 5A and 5B, it is assumed that a normal area 428 is predetermined in a coordinate space 426 that is defined by measurement values collected from the mechanism A and the measurement values collected from the mechanism B. That is, if the coordinates defined by measurement values collected from the mechanism A and the measurement values collected from mechanism B are located in a normal range 428, the state can be determined as being a normal state, or otherwise the state can be determined as being an abnormal state.

FIGS. 5A and 5B show an example of a temporal change 422 in a measurement value collected from the mechanism A and a temporal change 424 in a measurement value collected from the mechanism B. In the packaging machine 400 shown in FIG. 4, a processing target is required to be transported from the mechanism A to the mechanism B, and there is delay time $t_{A-B}$ between the temporal change 422 in the measurement value collected from the mechanism A and the temporal change 424 in the measurement value collected from the mechanism B. The delay time $t_{A-B}$ is dead time in the control system.

The following considers a case in which an abnormality is immediately detected using measurement values that are acquired in monitoring periods To1 and To2 that are set to monitor such temporal changes (and that are shorter than the delay time $t_{A-B}$) (such monitoring and detection of an abnormality is also referred to as "real-time detection"). Note that, to simplify the description, FIGS. 5A and 5B illustrate monitoring periods that have a predetermined time length. If this is the case, monitoring and detection of an abnormality are performed based on temporal changes in measurement values detected in the monitoring periods. On the other hand, if the monitoring periods correspond to the period of cycles in which measurement values are updated (the sampling period), it means that monitoring and detection are performed using measurement values (i.e. instantaneous values of the measurement values) at a specific moment (i.e. a specific point in time).

That is, real-time detection according to one or more embodiments includes processing that is performed to determine whether or not a control target is in a predetermined state, based on a plurality of measurement values acquired at predetermined points in time, or based on temporal changes in a plurality of measurement values detected during a predetermined period of time.

As shown in FIG. 5A, in the monitoring period To1, a measurement value from the mechanism A shows a sharp temporal change, whereas, in the monitoring period To1, a measurement value from the mechanism B does not show a temporal change.

Conversely, in the monitoring period To2, a measurement value from the mechanism A does not show a temporal change, whereas, in the monitoring period To2, a measurement value from the mechanism B shows a sharp temporal change.

As a result, it is assumed that a pair of measurement values measured from the mechanism A and the mechanism B in the monitoring period To1 and a pair of measurement values measured from the mechanism A and the mechanism B in the monitoring period To2 are both included in the normal range 428 that is defined in the coordinate space 426.

If measurement values collected from different mechanisms, which may have a time lag, are used in real-time detection without change, misdetection such as overlooking of an abnormality may occur. To avoid such misdetection, it is necessary to temporarily store temporal changes in the measured measurement values in the form of chronological data or the like, and therefore, it is impossible to realize real-time detection.

In contrast, as shown in FIG. 5B, in data collection processing according to one or more embodiments, delay processing is performed to shift a temporal change in a given measurement value. In the example shown in FIG. 5B, a predetermined delay time is added to a measurement value collected from the mechanism A that is located upstream, and thus a sharp temporal change occurs in both measurement values collected from the mechanism A and the mechanism B in the same monitoring period. In this way, characteristics that indicate the respective abnormalities of the measurement values are shown in the same monitoring period, and it is possible to determine that there is an abnormality based on such a phenomenon.

Note that if it is determined that there is an abnormality, it is possible to perform a procedure (abnormality processing) such as to remove a workpiece that has been determined to be abnormal, from the production line.

In this way, data collection processing according to one or more embodiments uses delay processing to absorb a time lag (a delay time), and detect the occurrence of an abnormality approximately at the same time as the occurrence of the abnormality.

D. Examples of Implementation of Delay Processing

Figure 6A:
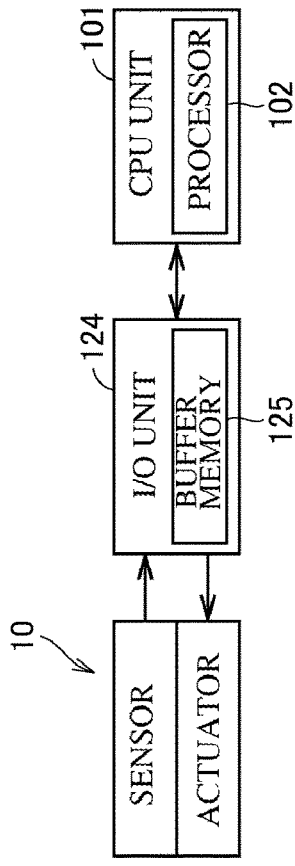
FIGS. 6A to 6C are schematic diagrams illustrating examples of implementation of delay processing that is included in data collection processing according to one or more embodiments.
Figure 6B:
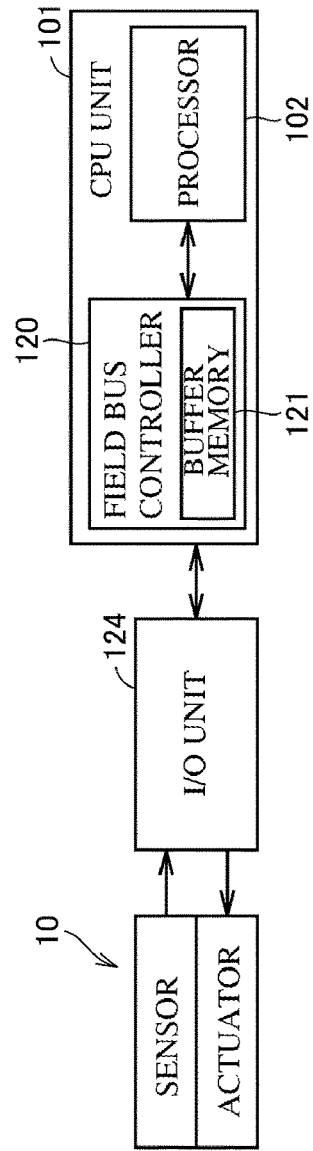
Figure 6C:
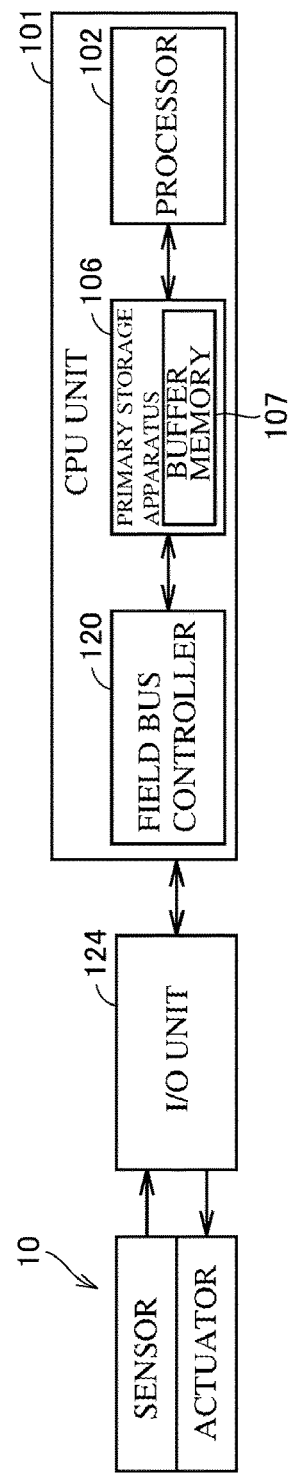

Next, the following describes examples of implementation of delay processing that is included in data collection processing according to one or more embodiments. FIGS. 6A to 6C are schematic diagrams illustrating examples of implementation of delay processing that is included in data collection processing according to one or more embodiments. As shown in FIGS. 6A to 6C, delay processing included in data collection processing according to one or more embodiments is typically realized using, for example, a buffer memory that is formed on a physical memory.

As shown in FIG. 6A, in an example of a configuration in which the CPU unit 101 and the field device group 10 are connected via the I/O unit 124, delay processing can be realized using a buffer memory 125 that is formed using a storage area of the I/O unit 124, for example. That is, the processor 102 of the CPU unit 101 can use a measurement value to which a predetermined delay time has been added by the buffer memory 125 of the I/O unit 124.

As shown in FIG. 6B, if the CPU unit 101 and the I/O unit 124 are connected to each other via a field bus, delay processing can be realized using the buffer memory 121 of the field bus controller 120. That is, the processor 102 of the CPU unit 101 can use a measurement value to which a predetermined delay time has been added by the buffer memory 121 of the field bus controller 120.

As shown in FIG. 6C, if the primary storage apparatus 106 in the CPU unit 101 has a sufficient capacity, delay processing can be realized using a buffer memory 107 that is formed using part of the primary storage apparatus 106, for example. That is, the processor 102 of the CPU unit 101 can use a measurement value to which a predetermined delay time has been added by the buffer memory 107 of the primary storage apparatus 106.

The configurations shown in FIGS. 6A to 6C may be combined in any manner, or hardware that is used to realize delay processing may be changed depending on what kinds of measurement values are to be collected from the control target. Note that, to realize delay processing, a circuit for realizing delay processing may be provided on a signal path between the field device group 10 and the I/O unit 124.

As shown in FIGS. 6A to 6C, it is possible to realize delay processing according to one or more embodiments by providing a buffer memory on a data transmission path from a field device, which measures a measurement value from a control target, to the control apparatus 100.

However, means for realizing delay processing according to one or more embodiments may be selected as appropriate, depending on the configurations of the target control apparatus, the control system 1 that is to be implemented, and so on.

E. Configuration

Figure 7:
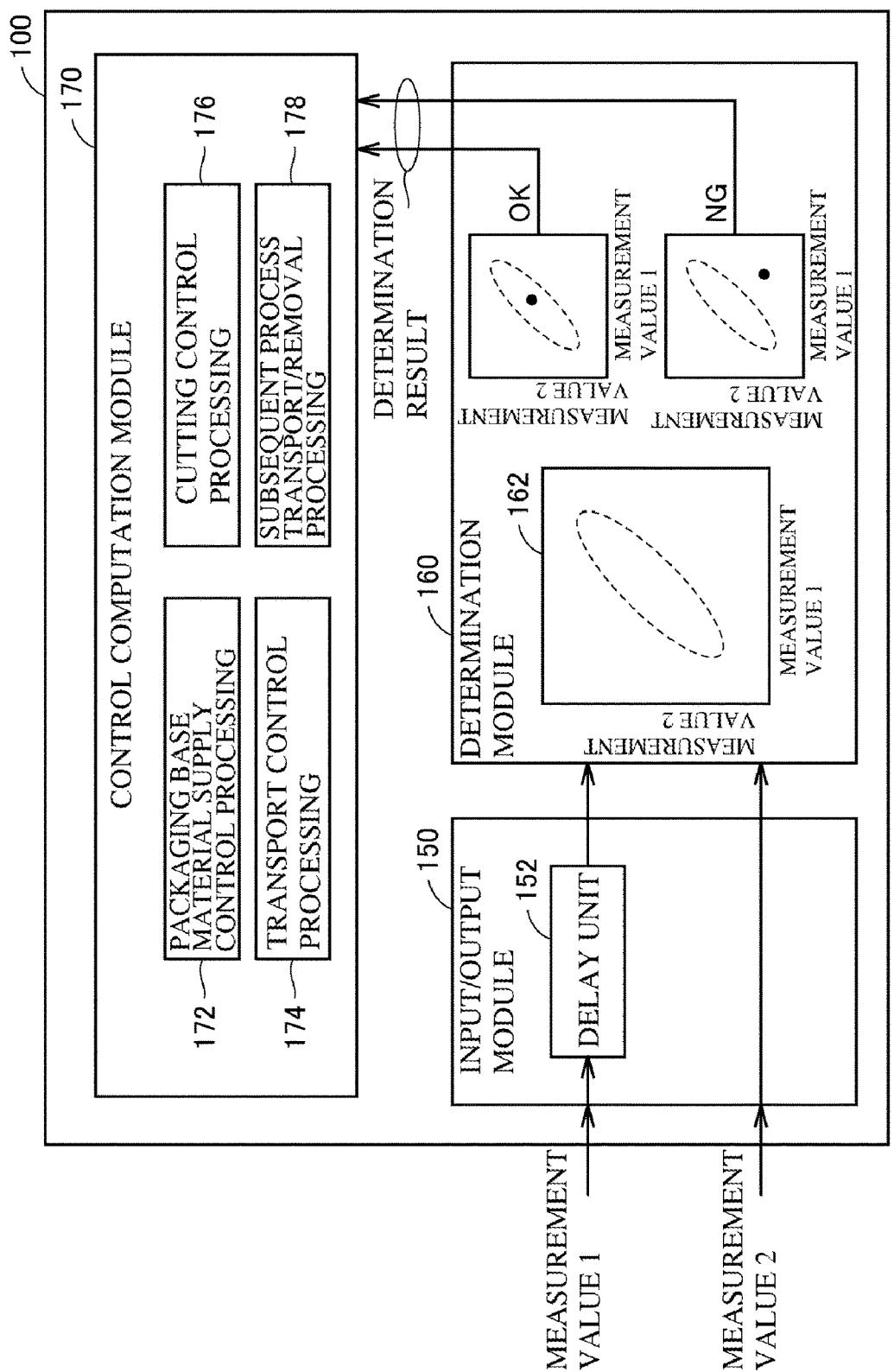
FIG. 7 is a schematic diagram illustrating a configuration according to data collection processing that is performed by a control apparatus according to one or more embodiments.

Next, the following describes an example of a configuration according to data collection processing that is performed by the control apparatus 100 according to one or more embodiments. FIG. 7 is a schematic diagram showing a configuration according to data collection processing that is performed by the control apparatus 100 according to one or more embodiments.

As shown in FIG. 7, the control apparatus 100 includes an input/output module 150, a determination module 160, and a control computation module 170, as the components thereof. These modules are realized by the processor 102 reading out a system program and a user program that are stored in the secondary storage apparatus 108, loading the programs to the primary storage apparatus 106, and executing the programs.

The input/output module 150 provides a module that acquires measurement values related to a control target. More specifically, the input/output module 150 collects input data from the field device group 10, and transmits output data to the field device group 10. The input/output module 150 outputs acquired measurement values to the determination module 160.

The input/output module 150 includes a delay unit 152 that secures a predetermined buffer amount in the buffer memory, and makes an instruction to perform FIFO operations, to delay a temporal change in a measurement value by a predetermined period of time, regarding a specified value (typically, a variable).

The determination module 160 determines whether or not a control target is in a predetermined state (e.g. a normal state or an abnormal state) based on a plurality of measurement values acquired at predetermined monitoring points in time, or temporal changes in a plurality of measurement values detected during a predetermined monitoring period.

The determination module 160 has a predetermined determination criterion 162, and applies one or more measurement values acquired from the input/output module 150 (some may be delayed by the delay unit 152) to the determination criterion 162 to output a determination result. Typically, the determination module 160 determines whether or not a control target, which is a monitoring target, is in a normal state or an abnormal state at the time of determination. The result of determination by the determination module 160 is output to the control computation module 170.

In the example of a configuration shown in FIG. 7, only a measurement value 1 passes through the delay unit 152. That is, the measurement value 1 is output to the determination module after being delayed by a predetermined period of time, and a measurement value 2 is output to the determination module upon being input from the field device group 10. Thus, the delay unit 152 provides delay time adding processing to add a predetermined delay time to at least one measurement value from among a plurality of measurement values that are used by the determination module 160 to perform determination.

The control computation module 170 is mainly realized by a user program being executed, and performs necessary processing depending on a control target. FIG. 7 shows an example of a configuration that includes processing corresponding to the packaging machine 400 shown in FIG. 4. More specifically, the control computation module 170 includes packaging base material supply control processing 172, transport control processing 174, cutting control processing 176, and determination result-dependent processing 178. These kinds of processing included in the control computation module 170 may be cyclically executed in predetermined control cycles.

The packaging base material supply control processing 172 includes control processing that is performed to control the supplying mechanism 402 shown in FIG. 4. The transport control processing 174 includes control processing that is performed to control the transport mechanism 404 shown in FIG. 4. The cutting control processing 176 includes control processing that is performed to control the cutting mechanism 406 shown in FIG. 4.

The determination result-dependent processing 178 changes depending on the result of determination received from the determination module 160. For example, if the result of determination received from the determination module 160 indicates a normal state, the determination result-dependent processing 178 is performed to transport a target workpiece so as to undergo the subsequent process, and if the result of determination received from the determination module 160 indicates an abnormal state, the determination result-dependent processing 178 is performed as removal processing, to remove the workpiece from which an abnormality has been detected, from the production line.

In this way, in the control apparatus 100 according to one or more embodiments, data collection processing including delay processing is applied in order to realize real-time detection, and thus it is possible to immediately apply necessary processing to workpieces that are sequentially processed and transported on the production line.

F. Application Examples

The description of one or more embodiments above focuses on delay time that occurs between measurement values that are respectively collected from a plurality of mechanisms included in a packaging machine. However, delay processing is applicable to another apparatus. Furthermore, it is possible to interpolate delay time not only between mechanisms that are included in a single machine, but also between a plurality of processes that are involved in a production line, by applying delay processing according to one or more embodiments.

The following describes examples of another machine and another production line to which data collection processing including delay processing according to one or more embodiments is applicable.

Figure 8A:
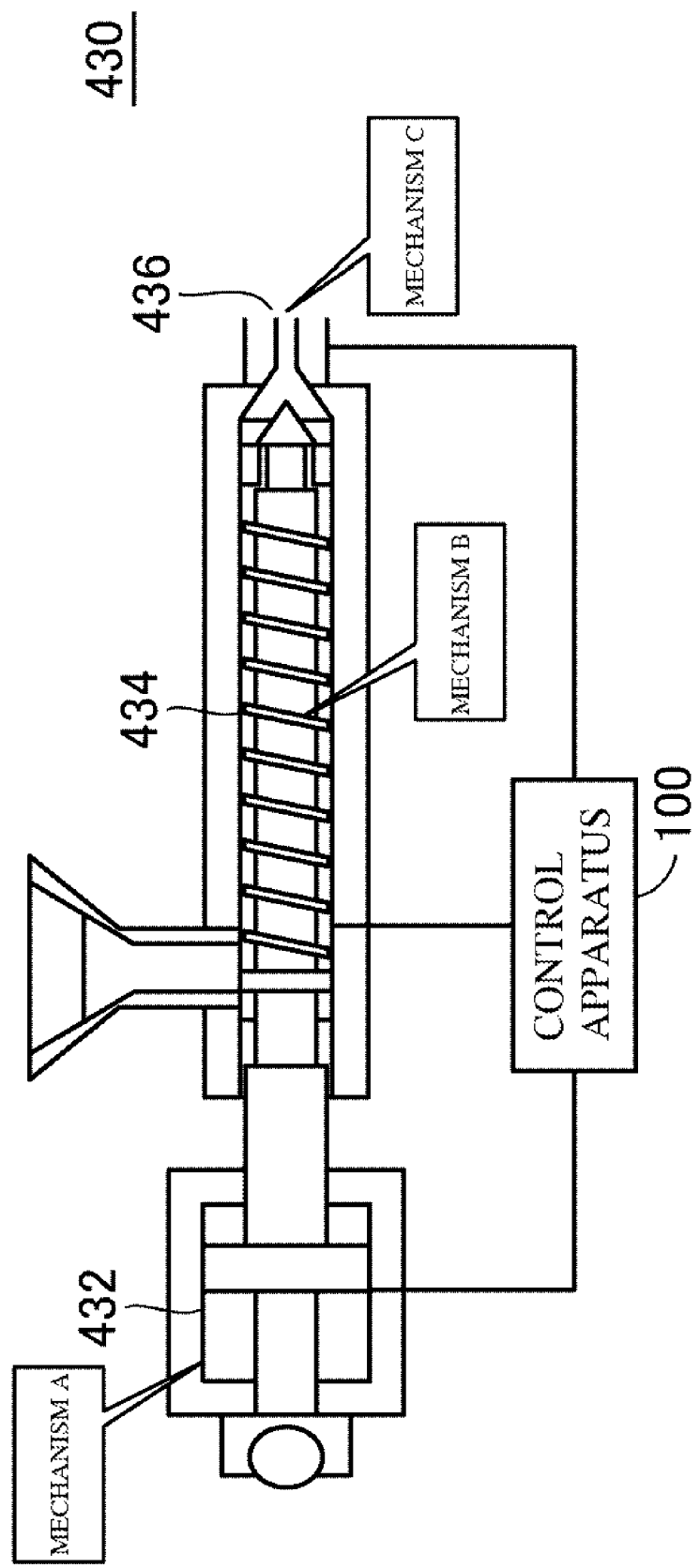
FIGS. 8A and 8B are schematic diagrams illustrating an application example of data collection processing that includes delay processing according to one or more embodiments.
Figure 8B:
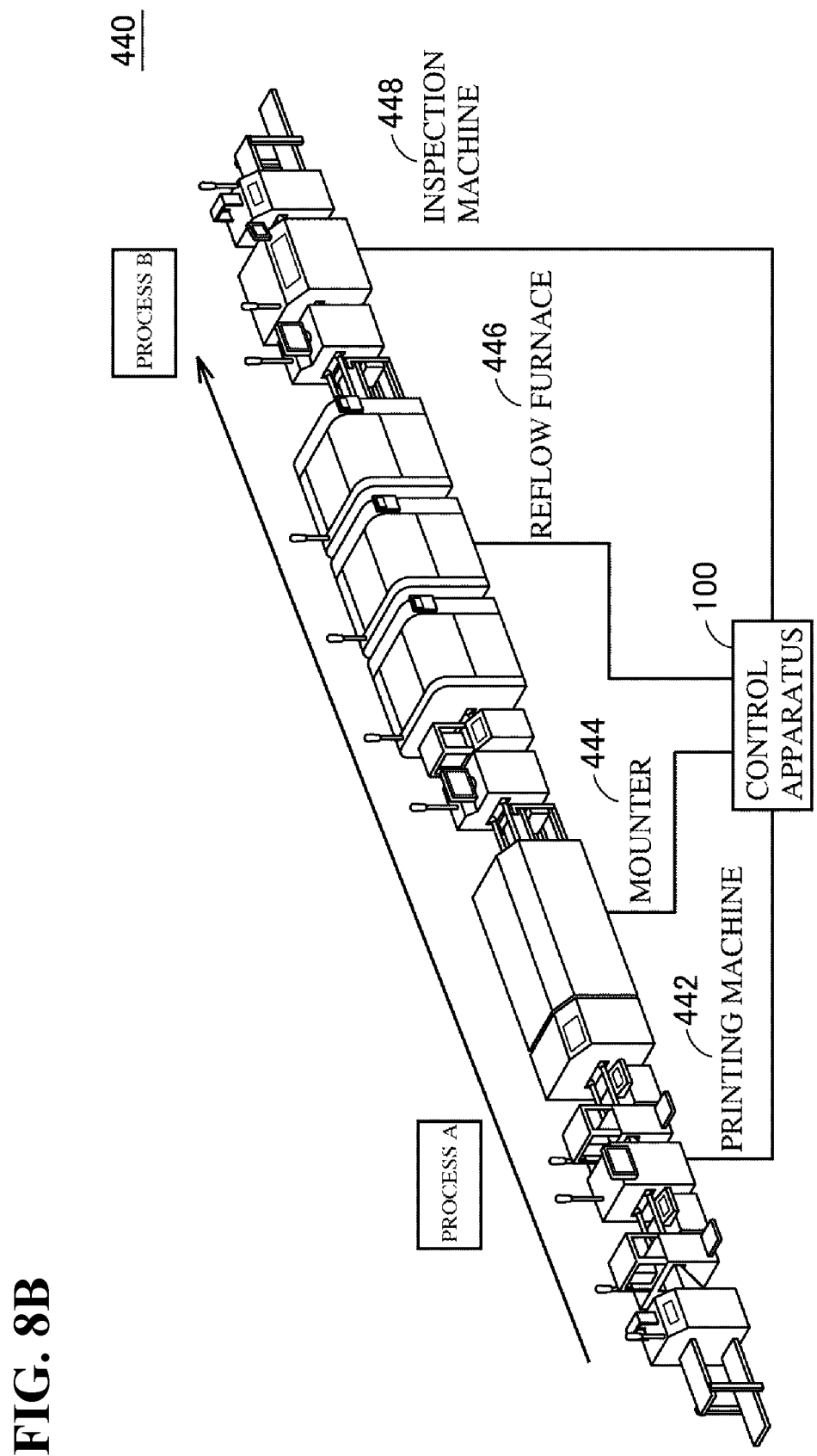

FIGS. 8A and 8B are schematic diagrams showing an application example of data collection processing that includes delay processing according to one or more embodiments. FIG. 8A shows a cross-sectional schematic diagram of a molding machine 430. The molding machine 430 includes a rotational mechanism 432 (the mechanism A), a heating delivery mechanism 434 (the mechanism B) that is rotated by the rotational mechanism 432 and transports heated materials, and an injection mechanism 436 (the mechanism C) that presses materials, which are sequentially supplied from the heating delivery mechanism 434, into a mold or the like.

Delay time corresponding to a period of time related to the transport of materials also occurs in each of the mechanisms included in such a rotational mechanism 432. It is possible to absorb such delay time by applying delay processing according to one or more embodiments, to realize real-time detection.

FIG. 8B shows a substrate implementation line 440. The substrate implementation line 440 includes a printing machine 442, a mounter 444, a reflow furnace 446, and an inspection machine 448, which are arranged along the implementation line. Workpieces are transported and processed along the implementation line. An implementation process (a process A) is realized through processing performed by these four machines, and this implementation process is followed by a subsequent process (a process B).

Delay time corresponding to a period of time related to the transport of workpieces also occurs between the processes that constitute such a substrate implementation line 440. It is possible to absorb such delay time by applying delay processing according to one or more embodiments, to realize real-time detection.

In this way, the delay time handled through delay processing according to one or more embodiments is a value that is determined based on a difference between mechanisms or processes of a control target with which a plurality of measurement values are associated. Data collection processing that includes delay processing according to one or more embodiments absorbs delay time that occurs between mechanisms that are included in a single machine, or between processes that are included in a single production line, to realize real-time detection.

G. Delay Time Determination Processing

Next, the following describes an example of processing that is performed to determine delay time that is added in delay processing according to one or more embodiments.

Figures 9, 10:
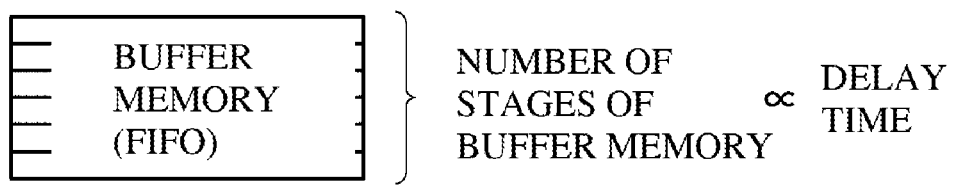
FIG. 9 is a diagram illustrating a buffer memory that is used to realize delay processing according to one or more embodiments.
FIG. 10 is a diagram illustrating examples of pieces of machine design data and recipe parameters that are used to determine a delay time that is used in delay processing according to one or more embodiments.

FIG. 9 is a diagram illustrating a buffer memory that is used to realize delay processing according to one or more embodiments. As shown in FIG. 9, delay processing according to one or more embodiments can be realized using a buffer memory that performs FIFO operations, for example. The number of stages of the buffer memory corresponds to the length of delay time. The period of cycles in which data is stored in the buffer memory or the period of cycles in which data is taken out from the buffer memory multiplied by the number of stages of the buffer memory corresponds to the delay time. Typically, the period of such data access to the buffer memory coincides with the period of I/O refresh processing, i.e. the period of control cycles.

In this way, it is possible to use a buffer memory that has a number of stages, the number corresponding to a delay time, to realize a mechanism that adds a delay time to measurement values.

The following mainly describes how to determine the number of stages of the buffer according to the required delay time.

g1: Method of Determination Based on Machine Design Data and Recipe Parameters

First, the following describes a method for determining a delay time based on machine design data and recipe parameters.

Figure 11:
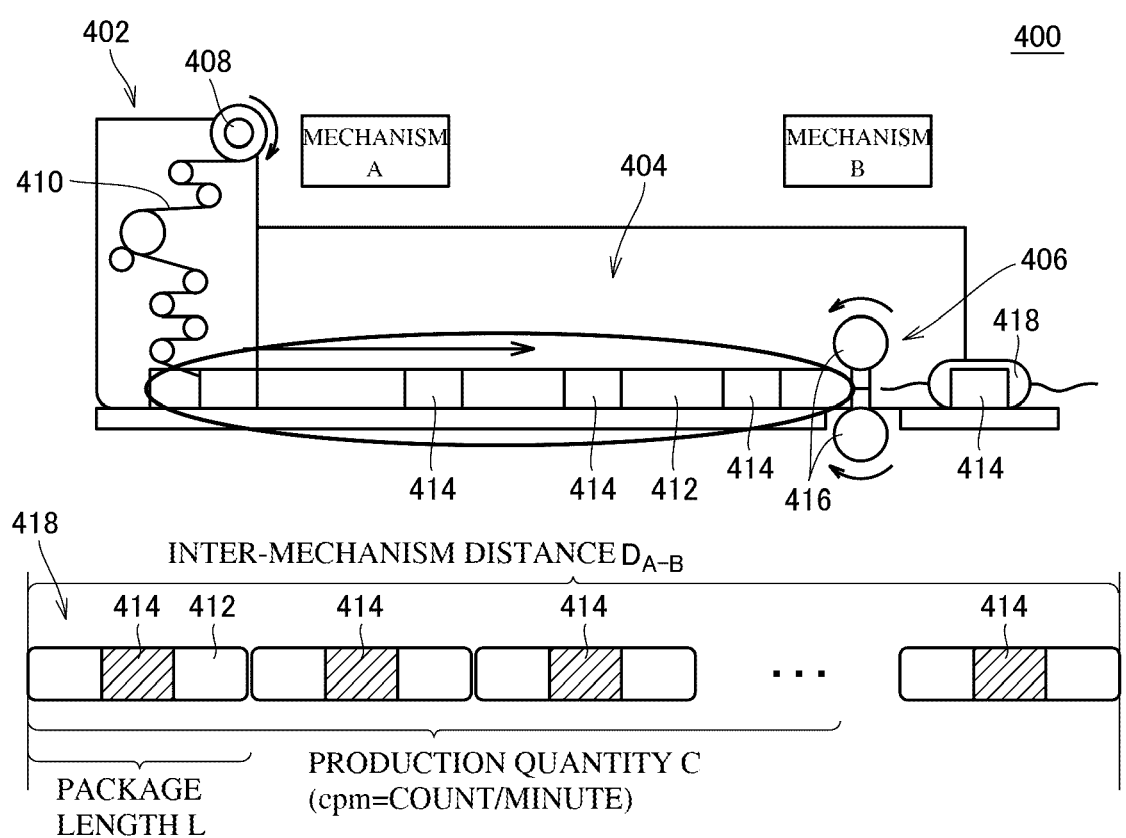
FIG. 11 is a diagram illustrating pieces of machine design data and recipe parameters, such as in FIG. 10.

FIG. 10 is a diagram showing examples of pieces of machine design data and recipe parameters that are used to determine a delay time that is used in delay processing according to one or more embodiments. FIG. 11 is a diagram illustrating the pieces of machine design data and recipe parameters shown in FIG. 10.

As shown in FIG. 10, a recipe that indicates manufacturing parameters is provided for each work type, for example. Each recipe includes recipe parameters such as a package length and production quantity. Also, machine design data includes a distance (an inter-mechanism distance) between the mechanism A and the mechanism B included in the packaging machine 400, for example.

Although FIG. 10 shows an example in which machine design data is provided for each recipe, only a single piece of machine design data may be provided if the transport path does not vary depending on the work type. In contrast, if the transport path varies depending on the work type, machine design data may be included in recipe parameters.

As shown in FIG. 11, an inter-mechanism distance $D_{A-B}$, which is a piece of machine design data shown in FIG. 10, indicates a transport distance of a workpiece from the mechanism A to the mechanism B.

The package length included in the recipe parameters indicates the length of the individual packages 418 that are ultimately manufactured, and corresponds to the length of a packaging material 412 that covers a workpiece 414, after being cut off. The production quantity included in the recipe parameters indicates the number of individual packages 418 manufactured by the packaging machine 400 per unit time, and is defined by a production count per minute (cpm), for example.

Using the machine design data and the recipe parameters shown in FIG. 10, it is possible to calculate a delay time that is to be added by the delay mechanism, i.e. the number of stages of the buffer memory, in the following manner.

First, a delay time $t_{A-B}(n)$ can be calculated as follows, based on the machine design data and the recipe parameters of each recipe (where n is the recipe number).

$$\text{delay time } t_{A-B}(n)=(60\times D_{A-B})/(C_n\times L_n)$$

The delay time $t_{A-B}(n)$ is divided by the period of sampling cycles (usually corresponding to the period of control cycles of the control apparatus 100), and thus the number of stages S(n) of the buffer memory can be calculated (where Ts is the period of sampling cycles).

$$\text{The number of stages } S(n)=t_{A-B}(n)/T_s$$

In this way, the number of stages S(n) of the buffer memory is determined based on the delay time and the period of cycles in which the corresponding measurement values are updated (the sampling period). Through the above-described calculation processing, it is possible to determine the number of stages S(n) of the buffer memory to realize a delay time corresponding to a control target.

As described above, delay time may be determined based on machine design data, which is an example of design data that indicates the properties of the mechanisms or processes of the control target, and recipe parameters that are examples of parameters that indicate operational states of the mechanisms or processes of a control target. Based on the delay time thus determined, a buffer memory that has a number of stages for compensating the delay time is formed.

g2: Method of Determination Based on Actual Measurement Results

Next, the following describes a method for determining a delay time based on actual measurement results.

Figure 12:
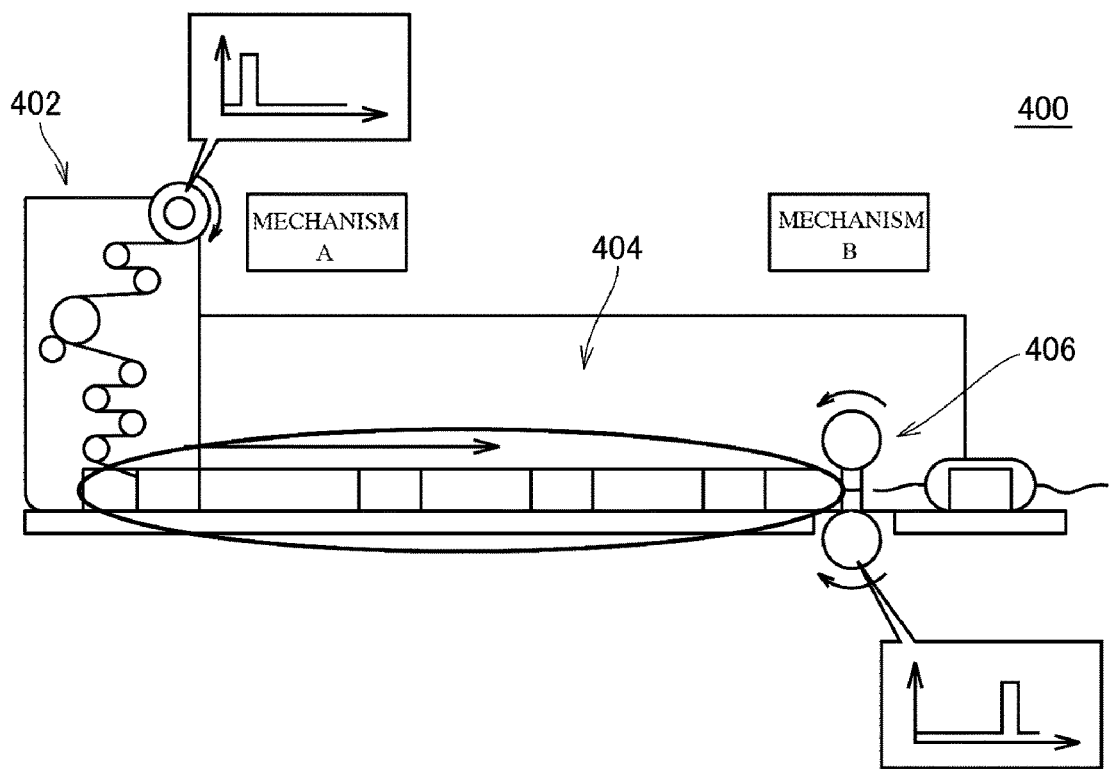
FIG. 12 is a diagram illustrating an actual measurement method for determining a delay time that is used in delay processing according to one or more embodiments.
Figures 13A, 13B:
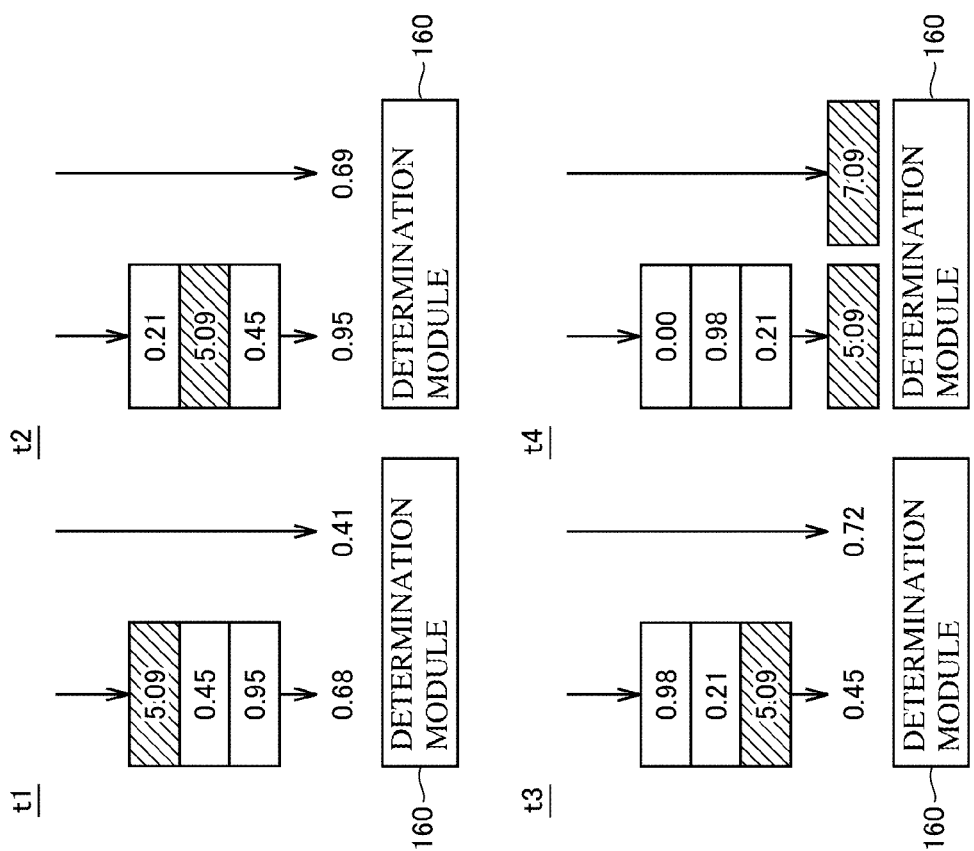
FIGS. 13A and 13B are diagrams illustrating how to determine a delay time using a method, such as in FIG. 12.

FIG. 12 is a diagram illustrating an actual measurement method for determining a delay time that is used in delay processing according to one or more embodiments. FIGS. 13A and 13B are diagrams illustrating how to determine a delay time using the method illustrated in FIG. 12.

As shown in FIG. 12, a feature (perturbation) that is likely to affect the measurement results is applied to the preceding mechanism (or process) from among a plurality of target mechanisms (or processes). For example, in the case of detecting, as an abnormality, a foreign object attached to a film, which is the packaging base material 410, an imitation foreign object is attached to the film, and then the film is supplied from the supplying mechanism 402 (the mechanism A). The film with the foreign object attached thereto travels past the transport mechanism 404, and arrives at the cutting mechanism 406 (the mechanism B). Measurement values of the film with the foreign object attached thereto, respectively measured in the supplying mechanism 402 (the mechanism A) and the cutting mechanism 406 (the mechanism B), show features that are delayed by a delay time, which should be corrected. That is, the delay time $t_{A-B}$ occurs between the measurement values, due to the time required for the perturbation to propagate between the mechanisms. A delay time that is used in delay processing is determined using the delay time $t_{A-B}$ that occurs between the measurement values.

For example, FIG. 13A shows that there is a delay having a period of three cycles in terms of the control cycles, between the peak generated by the perturbation applied to the mechanism A (the measurement value "5.09", which is shaded) and the peak of the mechanism B generated by the same perturbation (the measurement value "7.09", which is shaded). Therefore, in this example, the number of stages S of the buffer memory that constitutes the delay mechanism is set to "3".

In this way, if a film with a foreign object attached thereto is supplied as a perturbation, for example, it is possible to determine the number of stages of the buffer memory that constitutes the delay mechanism, based on a time lag between the features of perturbation that occur in the respective time waveforms of the measurement values acquired in the mechanism A and the mechanism B.

FIG. 13B shows an example of behavior of the buffer memory, of which the number of stages has been determined by the above-described method. At time t1 in FIG. 13B (corresponding to "12:11:48" in FIG. 13A), a measurement value "5.09" collected from the mechanism A is stored in the buffer memory, and a measurement value "0.41" collected from the mechanism B is input to the determination module.

Subsequently, at time t2 in FIG. 13B (corresponding to "12:11:49" in FIG. 13A), a measurement value "0.21" collected from the mechanism A is stored in the buffer memory, and a measurement value "0.69" collected from the mechanism B is input to the determination module. The measurement value "5.09" in the buffer memory is shifted by one stage.

Subsequently, at time t3 in FIG. 13B (corresponding to "12:11:50" in FIG. 13A), a measurement value "0.98" collected from the mechanism A is stored in the buffer memory, and a measurement value "0.72" collected from the mechanism B is input to the determination module. The measurement value "5.09" in the buffer memory is further shifted by one stage, to the stage that is immediately before output.

Subsequently, at time t4 in FIG. 13B (corresponding to "12:11:51" in FIG. 13A), a measurement value "0.00" collected from the mechanism A is stored in the buffer memory, and a measurement value "7.09" collected from the mechanism B is input to the determination module. Meanwhile, the measurement value "5.09" is input to the determination module.

That is, at time t4, the measurement value "5.09" collected from the mechanism A and the measurement value "7.09" collected from the mechanism B, which were generated by the same perturbation, are input to the determination module at the same time. Thus, the measurement values are input to the determination module in synchronization so that real-time detection can be realized.

Note that, if the period of update cycles (the sampling period) is different for each input measurement value, the number of stages of the buffer memory may be determined based on a difference between the periods of update cycles (the sampling periods) of the measurement values.

Figure 14:
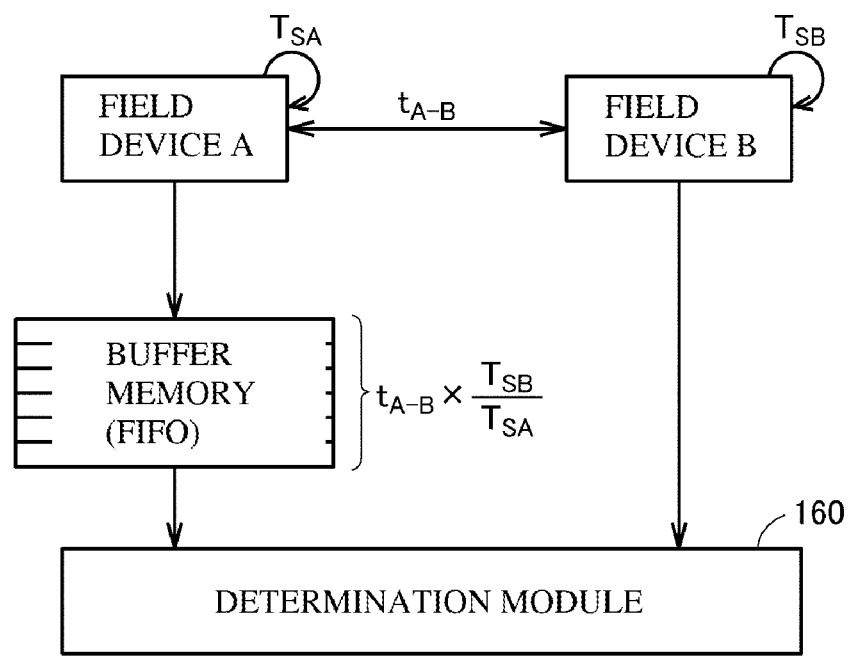
FIG. 14 is a diagram illustrating how to calculate the number of stages of a buffer memory to realize delay processing according to one or more embodiments.

FIG. 14 is a diagram illustrating how to calculate the number of stages of the buffer memory to realize delay processing according to one or more embodiments. As shown in FIG. 14, it is assumed that measurement values are respectively collected from a field device A and a field device B, for example. In this case, it is assumed that the sampling period of the field device A is $T_{SA}$, and the sampling period of the field device B is $T_{SB}$. Also, there is the delay time $t_{A\text{-}B}$ between the field device A and the field device B.

In such a case, the number of stages of the buffer memory used to absorb the delay time between the measurement value collected from the field device A and the measurement value collected from the field device B can be calculated by multiplying the delay time $t_{A\text{-}B}$ by the difference (the ratio) between the sampling periods of the field devices. That is, the number of stages of the buffer memory is determined based on a delay time that occurs between the input measurement signals, and the difference between the periods of update cycles (the sampling periods) of the measurement signals.

As described above, delay time may be determined based on the period of time from when a disturbance that has a predetermined feature is applied to the first mechanism or the first process of the control target, until when a feature corresponding to the disturbance appears in the second mechanism or the second process of the control target. Based on the delay time thus determined, a buffer memory that has a number of stages for compensating the delay time is formed.

H. Processing Procedures

Next, the following describes processing procedures for data collection processing according to one or more embodiments.

Figure 15:
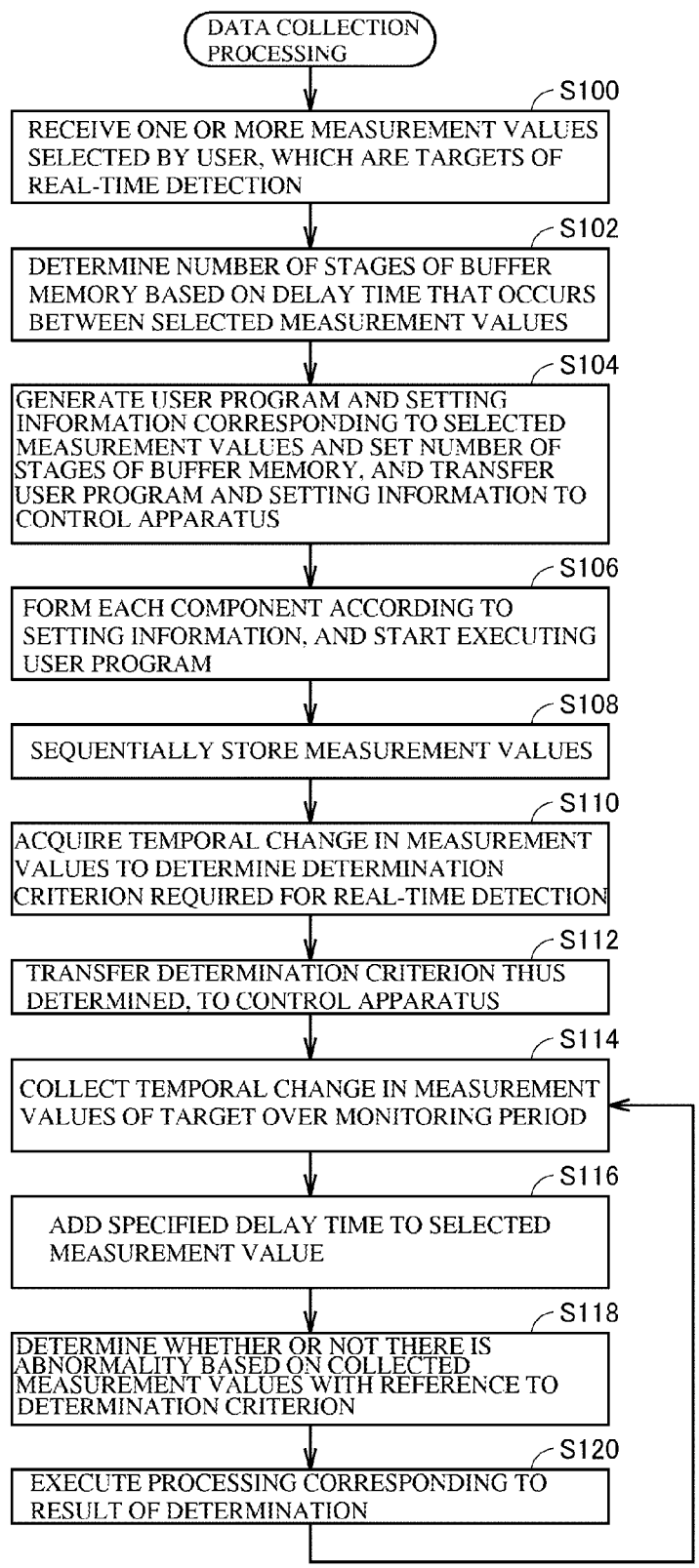
FIG. 15 is a flowchart illustrating processing procedures for data collection processing according to one or more embodiments.

FIG. 15 is a flowchart showing processing procedures for data collection processing according to one or more embodiments. Typically, the steps shown in FIG. 15 are realized by: the processor 102 of the control apparatus 100 reading out a system program and a user program stored in the secondary storage apparatus 108, loading the programs to the primary storage apparatus 106, and executing the programs; and the processor 202 of the support apparatus 200 reading out a support program stored in the secondary storage apparatus 208, loading the program to the primary storage apparatus 206, and executing the program.

As shown in FIG. 15, first, the support apparatus 200 receives one or more measurement values (variables) selected by a user, which are the targets of real-time detection (step S100). Next, the number of stages of the buffer memory is determined based on a delay time that occurs between the selected measurement values (step S102). As a method for determining the number of stages (a delay time) of the buffer memory, it is possible to employ a method that is based on machine design data and recipe parameters, or a method that is based on actual measurement results, as described above.

The support apparatus 200 generates a user program and setting information corresponding to the measurement values (variables) selected in step S100 and the set number of stages (the delay time) of the buffer memory determined in step S102, and transfers the user program and the setting information to the control apparatus 100 (step S104).

The control apparatus 100 forms each component according to the setting information from the support apparatus 200, and starts executing the user program (step S106). This setting information is used to form a buffer memory corresponding to a delay time that is to be compensated. The control apparatus 100 sequentially stores the measurement values (with a delay time added thereto) from the control targets, to the secondary storage apparatus 108, the memory card 116, or the like (step S108).

Thereafter, the support apparatus 200 acquires a temporal change in the measurement values stored in the secondary storage apparatus 108 of the control apparatus 100 or the memory card 116, to determine a determination criterion that is required for real-time detection (step S110). Note that the user may set a threshold range to determine the determination criterion. The support apparatus 200 transfers the determination criterion thus determined, to the control apparatus 100 (step S112).

Through the above-described procedures, the control apparatus 100 completes preparations for execution of real-time detection. More specifically, the control apparatus 100 collects a temporal change in measurement values of a target over a predetermined monitoring period (step S114), and adds a specified delay time to a selected measurement value (step S116). That is, the control apparatus 100 temporarily stores a measurement value that has been specified as a measurement value to which a delay time is to be added, to a buffer memory that has been formed in advance. Furthermore, with reference to the determination criterion acquired in advance, the control apparatus 100 determines whether or not there is an abnormality, based on the collected measurement values (or a temporal change in the measurement values) (step S118). Then, the control apparatus 100 executes processing corresponding to the result of determination in step S118 (step S120). Then, the control apparatus 100 repeats processing in step S114 and the subsequent steps.

I. Advantages

The control apparatus according to one or more embodiments executes delay time adding processing to add, to a given measurement value among a plurality of measurement values, a delay time that corresponds to the measurement value. Typically, such delay time adding processing is updated using a buffer memory that is managed under a system program. Such a buffer memory may perform FIFO operations in synchronization with control cycles.

If such delay time adding processing is employed, for example, when a certain kind of determination is to be performed based on a plurality of measurement values that may have a time lag (a delay time) between mechanisms or processes, it is possible to absorb the time lag by temporarily storing a measurement value acquired from the preceding mechanism or process to a buffer memory, and comparing this measurement value with a measurement value acquired from a succeeding mechanism or process, to realize real-time detection.

Conventionally, to perform a certain kind of determination based on a plurality of measurement values that have such a time lag, it is necessary to temporarily store chronological data that indicates a temporal change in measurement values, in a storage medium such as a secondary storage apparatus or a memory card, and then perform processing to match the time axes thereof to each other. Since it takes time to access data in a secondary storage apparatus or a memory card, such a method cannot realize real-time detection.

The control apparatus 100 according to one or more embodiments employs the above-described delay time adding processing to solve such a problem. Furthermore, by employing delay time adding processing that uses a buffer memory, it is possible to read and write necessary data in a shorter time compared to the time required to access a database or the like. Thus, it is possible to facilitate user program creation, and data analysis. Also, since it is relatively easy to change the size (the number of stages) of the buffer memory through setting or the like, it is possible to flexibly adapt to a delay time that occurs between mechanisms or processes. Therefore, even if the type or the like of workpieces has been changed, it is easier to realize the addition of a delay time corresponding to the workpieces after the change.

One or more embodiments disclosed in this application is to be considered in all respects as illustrative and not limiting. The scope of the present invention should be construed in view of the appended claims, rather than the foregoing description, and all changes that come within the meaning and range of equivalency of the claims are intended to be embraced therein.

The invention claimed is:

1. A control apparatus for controlling a control target, comprising:
   a processor configured with a program to perform operations comprising:
      operation as an acquisition unit configured to acquire at least first and second measurement values related to the control target; and
      operation as a determination unit configured to perform real-time detection comprising determining whether the control target is in a predetermined state based on the first and second measurement values acquired at a predetermined point in time, or based on temporal changes in the first and second measurement values acquired during a predetermined period of time; and
      a delay time adding unit configured to enable the determination unit to perform the real-time detection by adding a predetermined delay time to at least one of the first and second measurement values, wherein the delay time is calculated based on at least one of:
         design data that indicates properties of mechanisms or processes of the control target, and parameters that indicate operational states of the mechanisms or processes of the control target, and
         a period of time between a disturbance that has a predetermined feature occurring in a first mechanism or a first process of the control target and a feature corresponding to the disturbance appearing in a second mechanism or a second process of the control target.

2. The control apparatus according to claim 1, wherein the delay time is determined based on a difference between mechanisms or processes of the control target with which the first and second measurement values are associated.

3. The control apparatus according to claim 1, wherein the delay time adding unit comprises a buffer memory comprising a number of stages, the number of stages corresponding to the delay time.

4. The control apparatus according to claim 3, wherein the number of stages of the buffer memory is determined based on the delay time and a period of cycles in which the measurement value corresponding to the delay time is updated.

5. The control apparatus according to claim 3, wherein the buffer memory is located on a data transmission path from a field device to the control apparatus, the field device acquiring at least one of the first and second measurement values from the control target.

6. The control apparatus according to claim 2, wherein the delay time adding unit comprises a buffer memory comprising a number of stages, the number corresponding to the delay time.

7. The control apparatus according to claim 6, wherein the number of stages of the buffer memory is determined based on the delay time and a period of cycles in which the measurement value corresponding to the delay time is updated.

8. A non-transitory computer-readable storage medium storing a control program that is executed by a control apparatus for controlling a control target, the control program causing the control apparatus to perform operations comprising:
   acquiring at least first and second measurement values related to the control target;
   performing real-time detection comprising determining whether or not the control target is in a predetermined state based on the first and second measurement values acquired at a predetermined point in time, or based on temporal changes in the first and second measurement values acquired during a predetermined period of time; and
   enabling the real-time detection by adding a predetermined delay time to at least one of the first and second measurement values,
   wherein the delay time is calculated based on at least one of:
      design data that indicates properties of mechanisms or processes of the control target, and parameters that indicate operational states of the mechanisms or processes of the control target, and
      a period of time between a disturbance that has a predetermined feature occurring in a first mechanism or a first process of the control target and a feature corresponding to the disturbance appearing in a second mechanism or a second process of the control target.

9. A control system for controlling a control target, the control system comprising:
   a control apparatus; and
   a field device configured to measure at least first and second measurement values from the control target,
   wherein the control apparatus comprises:
      a processor configured with a program to perform operations comprising:
         operation as an acquisition unit configured to acquire the first and second measurement values; and
         operation as a determination unit configured to perform real-time detection comprising determining whether the control target is in a predetermined state based on a plurality of the first and second measurement values acquired at predetermined point in time, or based on temporal changes in the first and second measurement values acquired during a predetermined period of time; and
         a delay time adding unit configured to enable the determination unit to perform the real-time detection by adding a predetermined delay time to at least one of the first and second measurement values,
      wherein the delay time is calculated based on at least one of:
         design data that indicates properties of mechanisms or processes of the control target, and parameters that indicate operational states of the mechanisms or processes of the control target, and a period of time between a disturbance that has a predetermined feature occurring in a first mechanism or a first process of the control target and a feature corresponding to the disturbance appearing in a second mechanism or a second process of the control target.

10. A control method that is executed by a control apparatus for controlling a control target, the control method comprising:

acquiring at least first and second measurement values related to the control target;

performing real-time detection comprising determining whether or not the control target is in a predetermined state based on of the first and second measurement values acquired at a predetermined point in time, or based on temporal changes in the first and second measurement values acquired during a predetermined period of time; and enabling the real-time detection by adding a predetermined delay time to at least one of the first and second measurement values, wherein the delay time is calculated based on at least one of:

design data that indicates properties of mechanisms or processes of the control target, and parameters that indicate operational states of the mechanisms or processes of the control target, and a period of time between a disturbance that has a predetermined feature occurring in a first mechanism or a first process of the control target and a feature corresponding to the disturbance appearing in a second mechanism or a second process of the control target.

* * * * *